Jan. 15, 1952  J. W. CLERKE  2,582,860
WELDING SHIELD

Filed Nov. 14, 1945  3 Sheets-Sheet 1

INVENTOR.
JOHN W. CLERKE
BY Ridsdale Ellis
his ATTORNEY

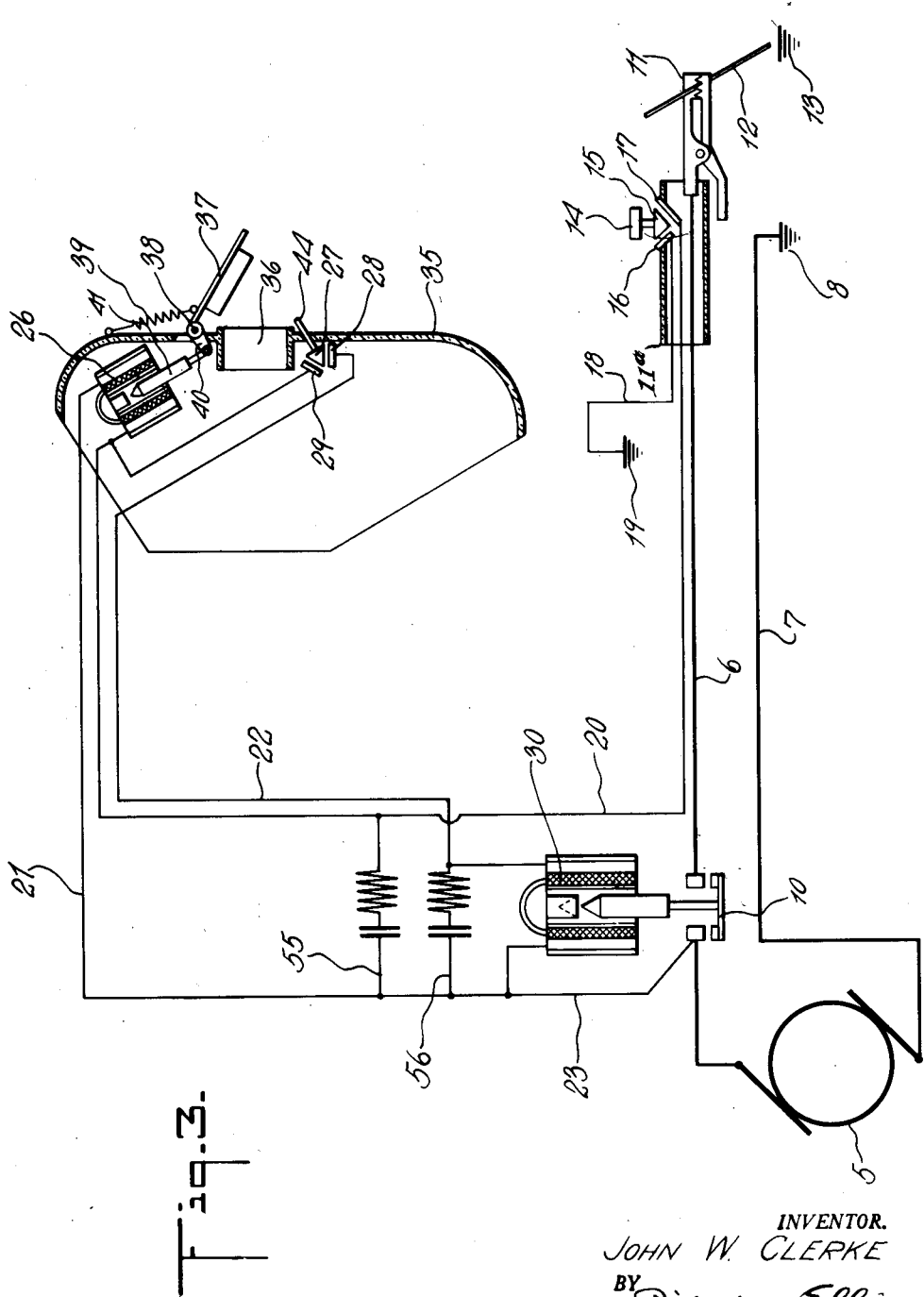

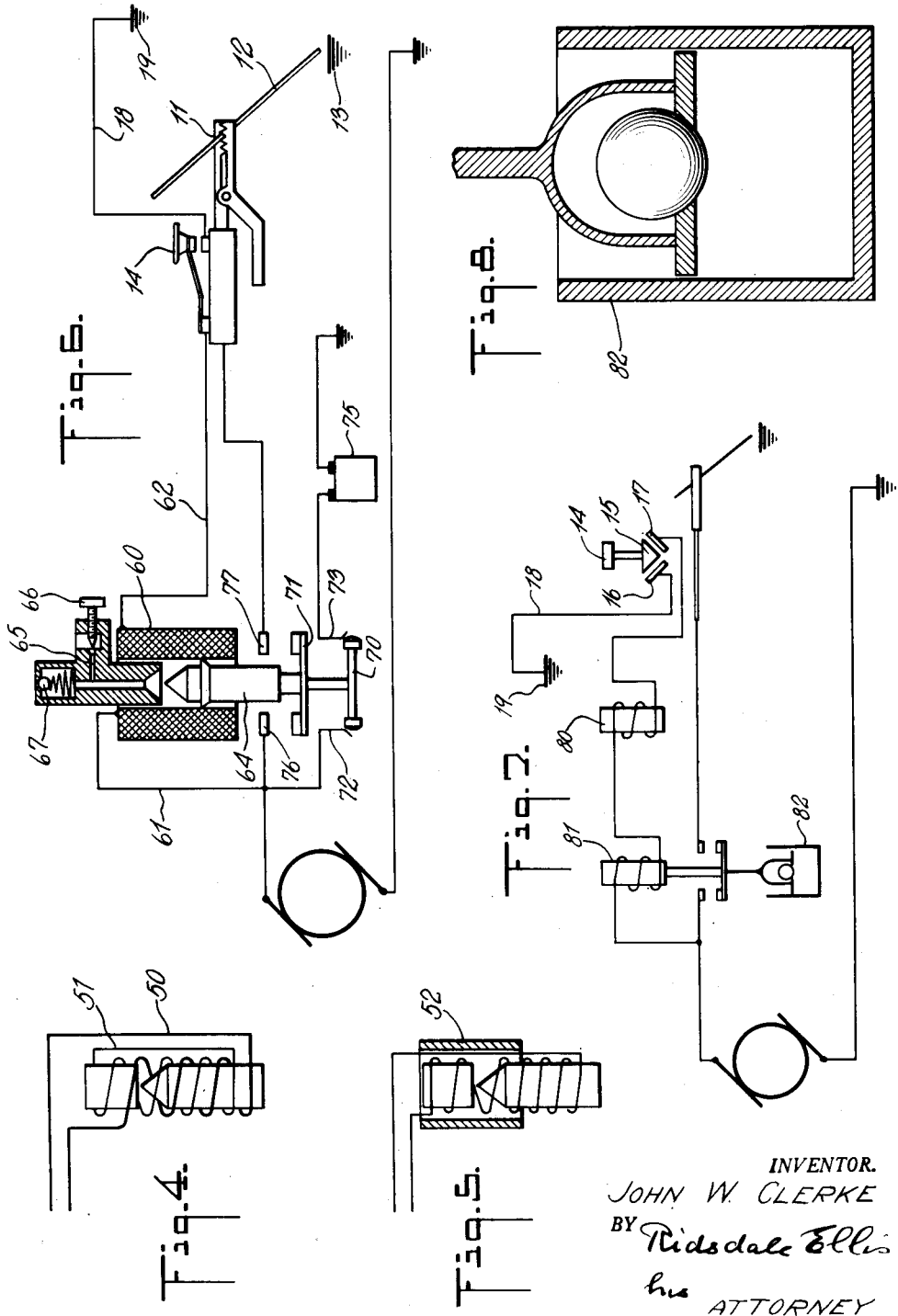

Patented Jan. 15, 1952

2,582,860

UNITED STATES PATENT OFFICE 2,582,860

WELDING SHIELD

John W. Clerke, Little Falls, N. J.

Application November 14, 1945, Serial No. 628,527

6 Claims. (Cl. 2—8)

This invention relates to arc welding shield and arc current controlling apparatus.

The rays given off by the welding arc are very harmful to the welding operator. If the operator is not shielded from such rays there is a danger of what is commonly known as "flashes" or "hot sand in the eyes" which is extremely painful, while it lasts, and sometimes keeps the welder from his work for several days. The skin is affected in a manner similar to a severe case of sunburn.

Shutters or shields made of very dense dark glass are used to reduce the intensity of the harmful rays to such an extent that the operator cannot see what he is doing while welding. When this is done the amount of daylight passing through the dark glass is reduced so much that the operator cannot see the work piece he is about to weld through the dark glass. To meet this difficulty it is common practice to use a light-impervious shield, with an opening in front of the eyes and a movable shutter of dark glass which can be brought into and out of register with such opening. The operator assembles his work and positions the welding rod close to the place where he is to begin welding with the shutter out of register. The shutter is then moved into register and when that has been done, but not before, the operator strikes the arc and then proceeds to weld by the light produced by the arc. The arc must, of course, be broken before the dark glass shutter is moved into non-registering position.

The usual type of welding-helmet is known as the "flip front" type. It is provided with a visor or shutter of dark glass which is moved in and out of register with the opening in the helmet by a quick jerk of the head. These helmets have various objections which outweigh the advantage of simplicity.

Apart from the fact that the flip front requires an additional movement by the operator, there is the more serious objection that the proper sequence of motions is not always followed. The shutter may not be moved into eye-protecting position before the arc is struck and it takes only a fraction of a second to produce temporary blindness.

It is highly advisable, therefore, that the closing of the shutter should not only be automatic but also always precede the striking of the arc. This automatic control must also ensure that the opening of the shutter should always follow and never precede the cessation of the arc.

One of the principal features of the present invention, therefore, is the combination of automatic means for closing the arc welding circuit after the shutter has moved into protective position with automatic means for opening such circuit before the shutter is moved into inoperative position.

Most conveniently both the closing of the arc circuit and the closing of the shutter are performed by means of solenoids the operation of which is controlled by a push-button switch or the like usually mounted on the rod holder. Conveniently this switch is located so that it can be closed by the thumb when the operator is set to start welding and released when the welding operation is completed. To obtain the desired sequence of operation the circuits through the solenoids must be opened and closed at different times and/or the time lags of the solenoids must differ. If the circuits were closed simultaneously the striking of the arc might occur simultaneously with or before or after the closing of the shutter, depending on the relative time lag of the two solenoids. If the time lag of the shutter solenoid was shorter than that of the main circuit solenoid, the shutter would close before the arc was struck and a "flash" would thereby be avoided. However, should the operator accidentally release the push-button switch before he broke the arc, the shutter would open before the main circuit solenoid could break the arc circuit and hence the operator would get a "flash."

One mode of avoiding this difficulty is to connect the two solenoids to the push-button switch in parallel and provide the branch in which the main circuit solenoid is located with a normally open switch arranged to be closed by the shutter solenoid at or near the end of its stroke. With such an arrangement the main arc circuit cannot be completed until the shutter is closed irrespective of the relative time lags of the two solenoids. Should the shutter stick or fail to close for any reason the arc circuit will not be closed.

This arrangement also enables the shutter solenoid to be given a greater time lag than the main circuit solenoid. This is important since, when the push-button is released, current ceases to flow through both solenoids simultaneously and hence the sequence of opening the shutter and opening the arc circuit depends upon the relative time lags of the two solenoids.

Another mode of securing the same results is to provide one or other of the solenoids with a dash-pot and check valve arranged so that such solenoid opens the shutter or main circuit switch slowly and closes rapidly or vice versa. A fairly slowly acting shutter solenoid may, by such means, be "straddled" by a dash-pot-controlled arc-circuit solenoid so that such arc current circuit is closed after the shutter is closed and is opened before the shutter begins to open, even though the circuits through both solenoids are closed and opened simultaneously.

A further method is to provide a slowly moving circuit-closing solenoid for closing the circuits through both the shutter solenoid and welding electrode and to arrange the first solenoid so that when it is energized it first closes the circuit through the shutter solenoid and then closes the circuit through the welding electrode an appreciable interval of time later. On de-energization the sequence of circuit-closings is reversed.

Another problem in connection with solenoid-operated shutters and arc-circuit switches arises from the great voltage variations around the time of formation of the arc. To create an arc the welding rod has to be momentarily brought into contact with the work to create for an instant a dead short circuit. The rod is then drawn away from the work to form the desired arc. The normal open-circuit voltage is around 60. When the rod touches the work it drops to about 2 to 4 volts. As the rod is pulled away the voltage rises to 20 to 40. For good welding the average voltage during welding, or what is termed the "burn-off" time, is about 30. With a $\frac{1}{8}$" rod the amperage is around 175 to 250.

In designing and constructing a solenoid it is necessary to design it for some specific voltage and the range of allowable variation is rather narrow due to overheating if the voltage is too high and loss of force if it is too low. That means that a simple solenoid which is designed to operate at say 60 volts may be able to work satisfactorily at 30, but, if the voltage drops to around 2 to 4 volts, the current due to such voltage ceases to exercise enough force to overcome the spring or weight acting in opposition to the magnetic field created by the flow of current through its coils. Unless some means are provided for bolstering the effect of such current the shutter may open just as the arc is being formed. When the button switch is closed the voltage is around 60 volts and a strong magnetic field is built up in the shutter solenoid. This magnetic field may be prevented from dropping to a value which would cause the spring or weight to retract the armature of the solenoid by using a lag coil in addition to its normal energizing coil, through which induced currents flow, produced by the decay of the field built up by the normal 60 volt exciting current.

A lag coil is a short-circuited coil surrounding the magnetic circuit. It accomplishes its function best when it is constructed by winding the short circuited coil and the exciting coil simultaneously by means of a doubled feed wire. Another good result can, however, be obtained by placing the lag coil on the magnet next to the pole cores under the exciting coil, and covering the same length of pole cores as the exciting coil. A very simple construction is a lag coil made from a seamless copper tube.

To supplement this time-delay feature a shunt consisting of a condenser and resistance in series may be connected across the exciting leads or windings to increase the amount of time delay. Its effectiveness depends upon the ability of the condenser to store energy, the amount of which varies as the square of the voltage and the first power of the capacity.

A lag of around $\frac{1}{5}$ second for the shutter solenoid and of about $\frac{1}{10}$ second for the main arc current solenoid is ordinarily sufficient to keep them closed until the arc has formed and the voltage has risen to about 30.

The control system of the present invention not only avoids any possibility of injury to the operator as the result of "flashes" but also enables the electrode holder to be dropped or laid on the work or bench without causing a dead short circuit. This follows, of course, from the fact that whenever the push-button is released current supply to the electrode holder is automatically cut off.

Ability to break the arc circuit by other means than drawing the welding rod away from the work avoids the difficulties caused by "freezing" of the rod to the work as the result of poor manipulation. In the conventional system of welding when the rod "freezes" to the work the current continues to flow through it and as it is a dead short circuit considerable heat is generated and quite some difficulty is experienced in removing the rod from the work and in some cases both work and rod are spoiled before the rod can be released. With the present apparatus embodying the present invention all the operator has to do is release the button switch and thereby stop the flow of current to the rod.

Solenoids operating on A. C. current, while known, are not as simple or as easy to construct or operate as solenoids operating on D. C. Consequently where the main arc current is A. C. it is advisable to insert a small rectifier in the control circuit so that the solenoids therein are operated by D. C. instead of A. C.

Three suitable forms of construction and circuit arrangements are illustrated diagrammatically in the accompanying drawings by way of example.

In the drawings:

Fig. 3 shows the preferred circuit arrangement in detail and also the chief parts operated and controlled thereby;

Figs. 4 and 5 show diagrammatically two forms of solenoids with lag coils;

Fig. 6 shows the circuit arrangement and delayed action solenoid switch in an alternative form of construction;

Fig. 7 shows another circuit arrangement and a further form of delayed action solenoid switch; and Fig. 8 is a section through the dash-pot of the solenoid switch construction shown in Fig. 7.

Figure 1:
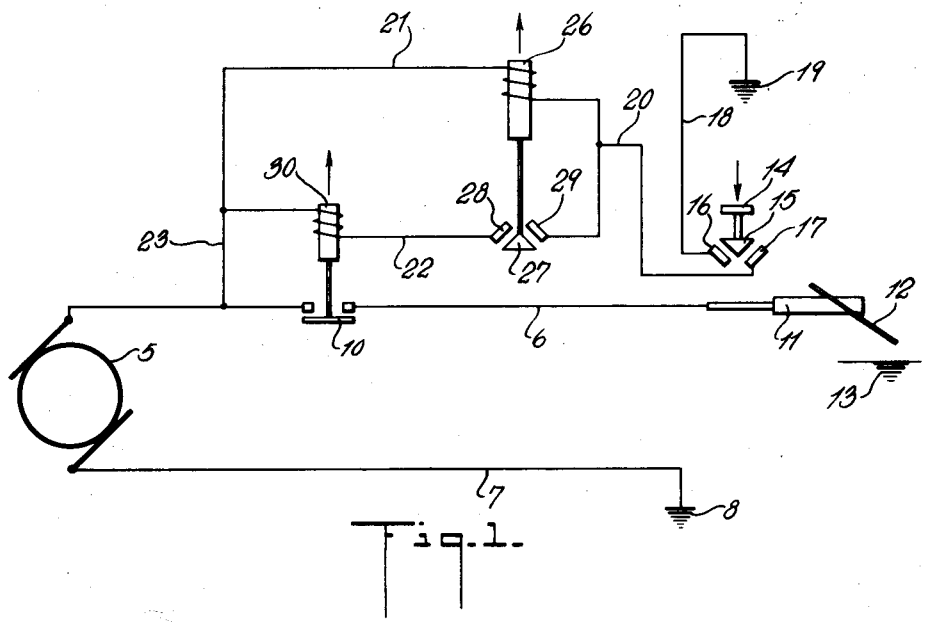
Fig. 1 shows the bare essentials of the circuit arrangement in the preferred form of construction.

The fundamental electrical circuits and elements of the preferred form are shown in Fig. 1. 5 is a D. C. generator or rotary converter supplying current to two leads 6 and 7. The last of these leads is grounded to the work or work support at 8. Lead 6 is connected through a 2-pole switch 10 to an electrode holder 11 carrying a welding rod 12. The arc is struck between the end of this rod and the work piece represented by the ground 13.

On the handle 11a of the welding rod holder 11 is a push button 14 having a member 15 adapted to connect electrically contacts 16 and 17. Contact 16 is connected by lead 18 to a ground 19 and thence through ground 8 to generator lead 7. Contact 17 is connected by lead 20 to two parallel circuits 21 and 22. The other ends of these circuits are connected by a lead 23 to the lead 6, intermediate the generator 5 and switch 10. As a result of these connections and the establishment of an electrical connection between contacts 16 and 17 the parallel circuits 21 and 22 are connected across the terminals of the generator 5.

In branch circuit 21 is a solenoid 26 which closes the shutter 37. As the shutter reaches its fully closed position it brings a member 27, which is connected to the armature of the solenoid 26 by a rod, as shown, into bridging engagement with contacts 28 and 29 in the branch circuit 22. This latter circuit includes a solenoid 30 which when energized, closes the switch 10 and permits welding current to flow to the rod 12. Current cannot flow between 28 and 29 until the shutter is so nearly closed that no injurious rays can reach the eyes. Hence even if the creation of the arc were to follow instantly the closing of the gap between the contacts 28 and 29 no harm could result.

Figure 2:
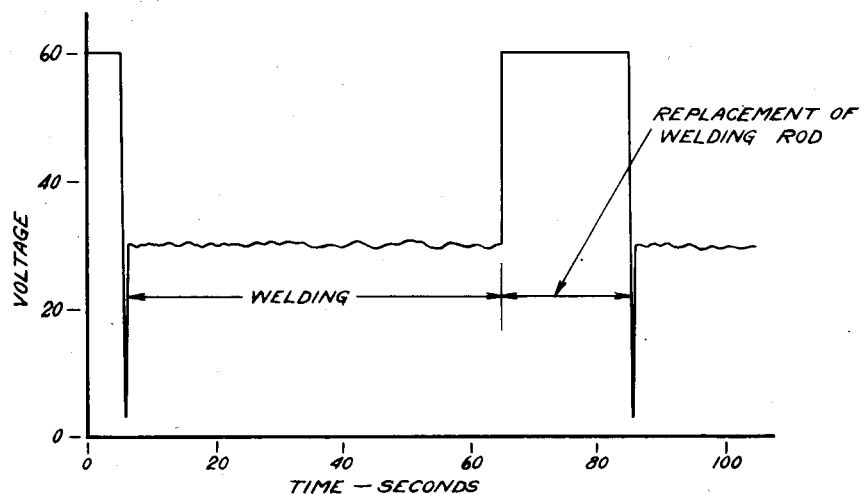
Fig. 2 is a curve showing the variations of voltage with time during a typical welding operation.

The current flow through the solenoids 26 and 30 is proportional to the voltage impressed thereon which is substantially the terminal voltage of the generator. This latter voltage varies greatly during the normal welding cycle, as shown in Fig. 2. That figure shows a curve of voltage with time illustrating how the voltage drops to nearly zero as the rod is brought into contact with the work and then increases as the rod is moved away from the work to create the desired arc. Provision is made for avoiding the possibility of the solenoid 26 permitting the shutter to open during the short circuit period. These provisions will be described later.

The application of the foregoing basic circuit arrangements to a welding helmet 35 is shown in Fig. 3. Such application is illustrated because, while the invention is applicable to shields mounted on the work bench, its chief field of application is welding helmets. The shield of the helmet has an opening 36 through which the operator views the work. A shutter 37 is pivotally mounted on the shield at 38. A spring 39 normally holds the shutter in elevated position, as shown in the drawings. An arm 40 extending rearwardly from the shutter is pivotally connected to the armature 41 of the solenoid 26. When the latter is energized movement of the armature closes the shutter against the tension of the spring 39. Projecting through the helmet shield below the opening 36 is a longitudinally slidable rod 44 carrying on its rear end the member 27, which, when the rod is pushed inwards, bridges the gap between the contacts 28 and 29 and completes the other parallel circuit between lead 20 and the generator 5. This circuit includes the solenoid 30 by which the main arc circuit is closed. The rod 44 is normally held in forwarding extending position by a spring not shown. However, as the shutter reaches its closed position its lower margin strikes the end of this rod and moves the member 27 inwardly, thereby bridging the gap between contacts 28 and 29. When that occurs current can flow through the solenoid 30.

As the current flow during short circuit is too low to energize the solenoids both of them are, to advantage, constructed so that there is sufficient time lag in their operation to carry them over the short circuit period. Solenoids with lag coils are well known and of various types. Two forms of constructions are illustrated in Figs. 4 and 5. In Fig. 4, there is, in addition to the exciting coil, 50, a short-circuited coil 51 in which current is induced as the magnetic field dies away as the result of cessation or reduction of current in the exciting coil. This induced current tends to create a magnetic field and so slows down the decay of the initial field. The solenoid of Fig. 5 acts on the same principle and differs only from that of Fig. 4 in that a copper tube 52 replaces the coil of wire 51 as the lag producing element.

To increase the solenoid time lags condenser-resistance shunts 55 and 56 may be connected as shown across the terminals of the exciting coils of the two solenoids. The condensers in these shunts store electricity which discharges through the exciting coils when their normal source of energy is cut off.

The lag time can be varied by changing the proportions between the lengths of the exciting and lag coils, by changing the capacity of the condenser shunted around the exciting coil and by varying other constructional factors. The solenoid 26 should have a greater lag time than the solenoid 30, so that, when the circuit through the solenoids is opened by releasing pressure on the push-button 14, the shutter will remain closed until the switch 10 has opened thereby breaking the arc circuit.

It is not essential to arrange for the closing of the circuit through the arc switch solenoid by the movement of the shutter. Two alternative forms of construction are shown in Figs. 6 and 7, in which the desired results are obtained by other means. In the first of these two forms the push button 14 closes the circuit through the arc-switch solenoid 60 and its leads 61 and 62. The circuit through the shutter solenoid is closed by the arc switch solenoid—the reverse of the mode of operation of the form shown in Figs. 1 to 4. While the order of closing the solenoid circuits is reversed, the order of closing the main arc switch and the shutter are not changed. The armature carries two contact arms 70 and 71. As the armature rises it brings the ends of the arm 70 into engagement with spring contacts 72 and 73 and thereby completes the circuit through the shutter solenoid 75 an appreciable time before the contact arm 71 engages the contacts 76 and 77 to complete the arc circuit. On de-energization the arc circuit is necessarily broken before the shutter solenoid circuit.

It is desirable to provide ample time for the shutter to close before the arc circuit is closed. For this purpose the armature should move upwardly slowly. On the other hand to avoid sparking or arcing at the contacts 76 and 77 it is advantageous to move the armature downwards rapidly as soon as the solenoid has been de-energized.

To obtain this slow up and rapid down movement an air dash-pot device may be employed. As shown, the solenoid is provided with a close fitting armature 64. At the top of the solenoid is an air-bleed opening 65 controlled by a needle valve 66 and a spring-pressed check valve 67. When the solenoid is energized the air above the armature has to pass out through the air bleed so that the armature is compelled to rise slowly. On de-energization air can also enter through the check valve so that the armature can drop rapidly.

In the form of construction shown in Fig. 7 the shutter solenoid 80 and the arc-circuit solenoid 81 are connected in series so that both are energized simultaneously. The armature of the arc-circuit solenoid is provided with a dash-pot 82 so that the armature will rise slowly and drop rapidly. By giving the solenoid 80 a time lag intermediate those of the solenoid 81 on its up and down strokes respectively, the shutter will close before the arc circuit is closed and open after the arc circuit is broken.

What I claim is:

1. An arc welding shield shutter and an arc circuit controlling apparatus comprising an electrode holder, a spring actuated normally open switch mounted thereon having one contact arranged for electrical connection to one terminal of the source of welding current and the other contact arranged for electrical connection to the other terminal of said source, a solenoid having a substantial time lag in series with the last mentioned connection, and means operated by the solenoid for moving the shutter into eye-protecting position when the contacts are brought together.

2. An arc welding shield shutter and arc circuit controlling apparatus comprising an electrode holder, a spring actuated normally open switch mounted thereon, an electrical circuit controlled by said switch, a solenoid in said circuit in series therewith, means operated by the solenoid for moving the shutter into eye-protecting position when said circuit is closed by said switch, a second switch closed by said solenoid as the shutter is completing its movement into eye-protecting position and opened by said solenoid as the shutter is beginning its movement out of eye-protecting position, a second solenoid energized by the closing of the second switch, a third switch arranged to open and close the arc circuit, and a mechanical connection between said second solenoid and said third switch to close the latter when the former is energized, the first solenoid having a greater time lag than the second.

3. An arc circuit controlling apparatus comprising an electrode holder, a normally open switch for controlling the supply of arc current to said holder from the source of welding current, a spring-actuated normally open switch mounted on said holder having one contact arranged for electrical connection to one terminal of the source of welding current and the other contact arranged for electrical connection to the other terminal of said source, and a solenoid in series with the last mentioned connection, for closing the first switch when current passes through its windings.

4. An arc welding shield shutter and an arc circuit controlling apparatus comprising an electrode holder, a spring-actuated normally-open switch mounted thereon, parallel electrical circuits controlled by said switch, a solenoid in each circuit in series therewith, an eye-protecting shutter arranged to move in and out of eye-protecting position, means operated by one solenoid for moving the shutter into eye-protecting position when its circuit is closed by said switch, means for restoring the shutter to non-protecting position when such circuit is opened and such solenoid is de-energized, a normally open arc-current switch, means operated by the second solenoid for closing said switch, means for restoring the said arc-current switch to open-circuit position when the circuit containing the second solenoid is opened and second solenoid is de-energized, the second restoring means having a greater time lag than the first.

5. In combination with a welding shield, a shutter and arc circuit controlling apparatus, means carried by the shield for moving said shutter into and out of eye-protecting position including time lag means, an arc welding circuit, a switch in said circuit, means including a solenoid for closing said switch after the shutter has moved into eye-protecting position, a second switch for controlling the flow of current through said solenoid, the moving parts of said second switch being mechanically independent of the moving parts of the first switch whereby movement of the first switch does not affect the operation of the second switch, and means including a manually operable switch in circuit connection with said solenoid for opening the first switch before said shutter has moved out of eye-protecting position.

6. In combination with a welding shield, a shutter and arc circuit controlling apparatus, means carried by the shield for moving said shutter into and out of eye-protecting position including a time-lag solenoid, an arc welding circuit, a switch in said circuit, and means including a second solenoid for closing said switch after the shutter has moved into eye-protecting position, a manually operated switch for controlling the flow of current through both solenoids whereby when the latter switch is closed the shutter is held closed independently of the flow of current through the welding circuit and when it is opened both solenoids are released, said solenoids being constructed so that the second solenoid releases before the first whereby the welding circuit is opened before the shutter has moved out of eye-protecting position.

JOHN W. CLERKE.

REFERENCES CITED

The following references are of record in the file of this patent:

UNITED STATES PATENTS

| Number | Name | Date |
|---|---|---|
| 1,497,012 | Goodspeed | June 10, 1924 |
| 1,822,308 | Norton | Sept. 8, 1931 |
| 2,384,517 | Zimmerman et al. | Sept. 11, 1945 |
| 2,418,415 | Lesser | Apr. 1, 1947 |